(12) United States Patent
Dasgupta et al.

(10) Patent No.: US 10,581,901 B2
(45) Date of Patent: Mar. 3, 2020

(54) INCREASED GRANULARITY AND ANOMALY CORRELATION USING MULTI-LAYER DISTRIBUTED ANALYTICS IN THE NETWORK

(71) Applicant: Cisco Technology, Inc., San Jose, CA (US)

(72) Inventors: Sukrit Dasgupta, Norwood, MA (US); Jean-Philippe Vasseur, Anchorage, AK (US); Andrea Di Pietro, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 357 days.

(21) Appl. No.: 15/154,349

(22) Filed: May 13, 2016

(65) Prior Publication Data

US 2017/0279847 A1 Sep. 28, 2017

Related U.S. Application Data

(60) Provisional application No. 62/313,300, filed on Mar. 25, 2016.

(51) Int. Cl.
*H04L 29/06* (2006.01)
*H04L 12/66* (2006.01)
*G06N 20/00* (2019.01)

(52) U.S. Cl.
CPC ......... *H04L 63/1458* (2013.01); *G06N 20/00* (2019.01); *H04L 12/66* (2013.01); *H04L 63/1416* (2013.01); *H04L 63/1425* (2013.01)

(58) Field of Classification Search
CPC ... H04L 49/351; H04L 12/66; H04L 63/1416; H04L 63/1458; H04L 63/1425; G06N 99/005; G06N 5/043
See application file for complete search history.

(56) References Cited

U.S. PATENT DOCUMENTS

| 7,760,653 | B2 | 7/2010 | Poletto |
| 8,458,795 | B2 | 6/2013 | Weber et al. |
| 8,677,485 | B2 | 3/2014 | Sharma et al. |
| 9,143,522 | B2 | 9/2015 | Wang et al. |
| 9,712,554 | B2 * | 7/2017 | Hassanzadeh ...... H04L 63/1433 |
| 2014/0283052 | A1 * | 9/2014 | Jordan ................. G06F 21/562 726/23 |

(Continued)

OTHER PUBLICATIONS

Johnson et al. "Network Anomaly Detection Using Autonomous System Flow Aggregates" GLOBECOM 2014; pp. 1-8.

*Primary Examiner* — Paul E Callahan
(74) *Attorney, Agent, or Firm* — Behmke Innovation Group LLC; James Behmke; Stephen D. LeBarron

(57) ABSTRACT

In one embodiment, a primary networking device in a branch network receives a notification of an anomaly detected by a secondary networking device in the branch network. The primary networking device is located at an edge of the network. The primary networking device aggregates the anomaly detected by the secondary networking device and a second anomaly detected in the network into an aggregated anomaly. The primary networking device associates the aggregated anomaly with a location of the secondary networking device in the branch network. The primary networking device reports the aggregated anomaly and the associated location of the secondary networking device to a supervisory device.

20 Claims, 20 Drawing Sheets

(56) References Cited

U.S. PATENT DOCUMENTS

2016/0062950 A1\* 3/2016 Brodersen .............. G06F 17/18
                                                      702/181
2016/0261465 A1\* 9/2016 Gupta ................ H04L 12/2816

\* cited by examiner

INCREASED GRANULARITY AND ANOMALY CORRELATION USING MULTI-LAYER DISTRIBUTED ANALYTICS IN THE NETWORK

RELATED APPLICATIONS

This application claims priority to U.S. Provisional Application No. 62/313,300, filed Mar. 25, 2016, entitled "INCREASED GRANULARITY AND ANOMALY CORRELATION USING MULTI-LAYERED DISTRIBUTED ANALYTICS IN THE NETWORK," by Dasgupta et al., the contents of which are hereby incorporated by reference.

TECHNICAL FIELD

The present disclosure relates generally to computer networks, and, more particularly, to increasing granularity and anomaly correlation using multi-layered distributed analytics in the network.

BACKGROUND

Generally, Internet Behavioral Analytics (IBA) refers to the use of advanced analytics coupled with various networking technologies, to detect anomalies in a network. Such anomalies may include, for example, network attacks, malware, misbehaving and misconfigured devices, and the like. For example, the ability to model the behavior of a device (e.g., a host, networking switch, router, etc.) allows for the detection of malware, which is complimentary to the use of firewalls that use static signature. Observing behavioral changes (e.g., deviation from modeled behavior) using flows records, deep packet inspection, and the like, allows for the detection of an anomaly such as an horizontal movement (e.g. propagation of a malware, . . . ) or an attempt to perform information exfiltration, prompting the system to take remediation actions automatically.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
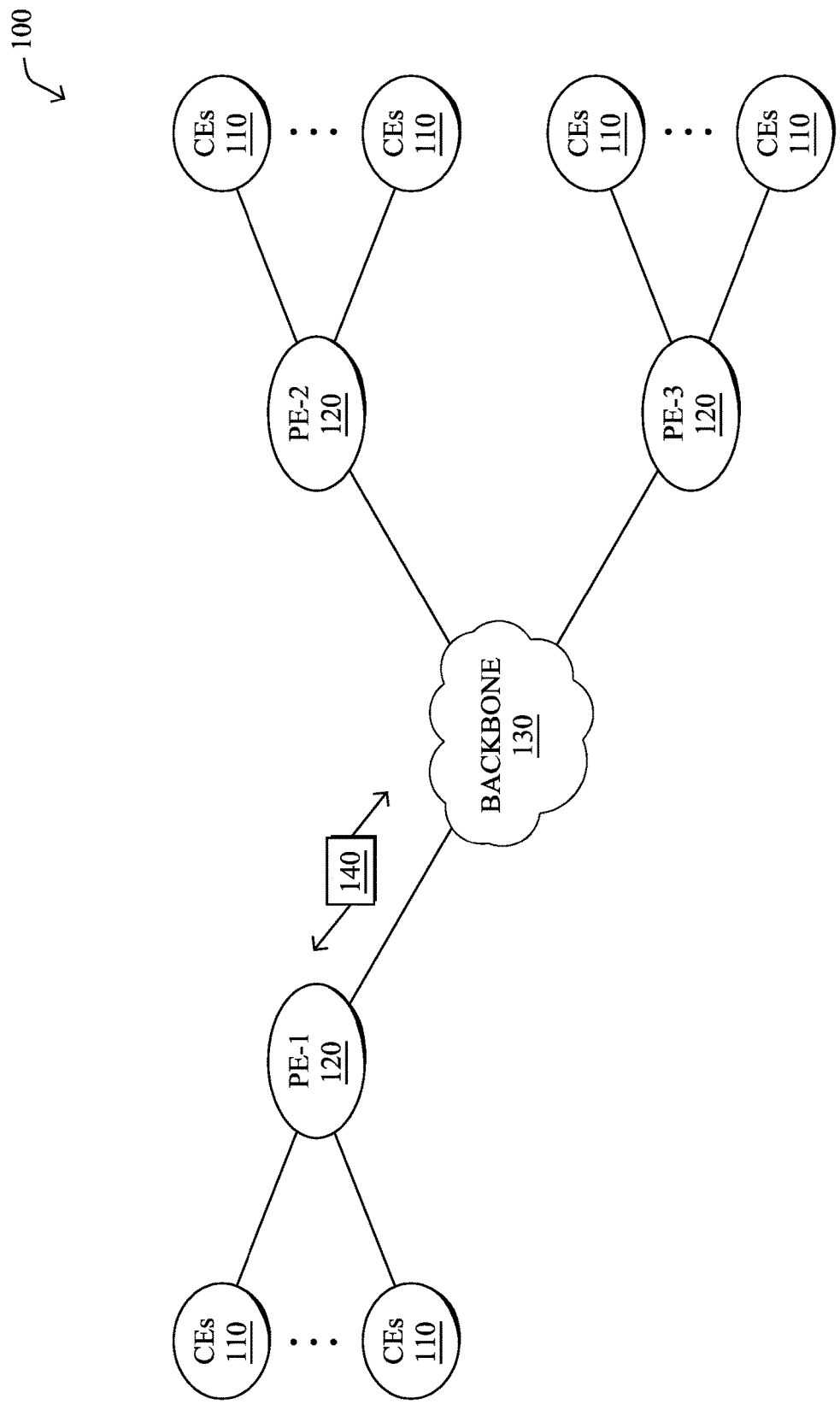
FIGS. 1A-1B illustrate an example communication network.

According to one or more embodiments of the disclosure, a primary networking device in a branch network receives a notification of an anomaly detected by a secondary networking device in the branch network. The primary networking device is located at an edge of the network. The primary networking device aggregates the anomaly detected by the secondary networking device and a second anomaly detected in the network into an aggregated anomaly. The primary networking device associates the aggregated anomaly with a location of the secondary networking device in the branch network. The primary networking device reports the aggregated anomaly and the associated location of the secondary networking device to a supervisory device.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
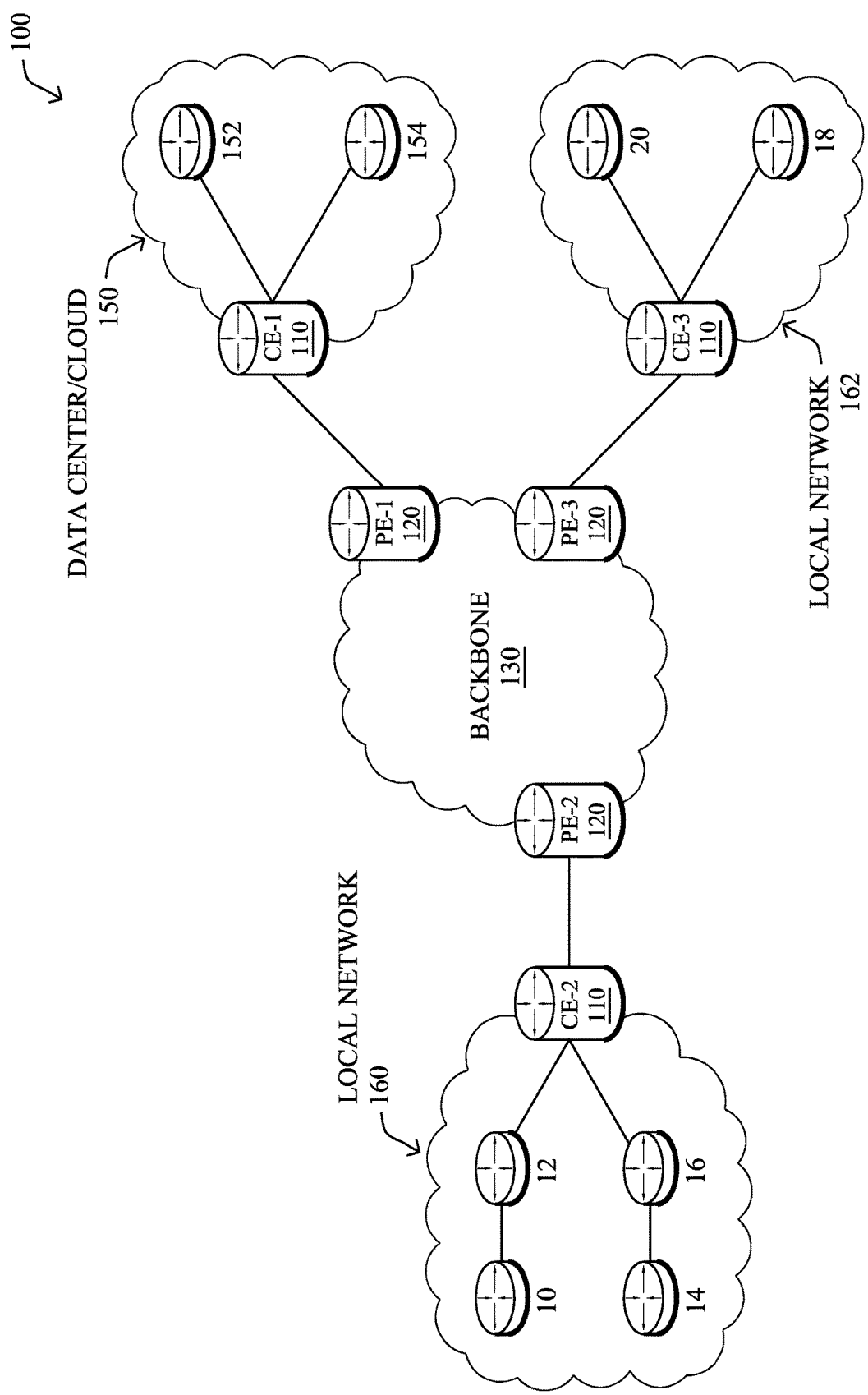

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
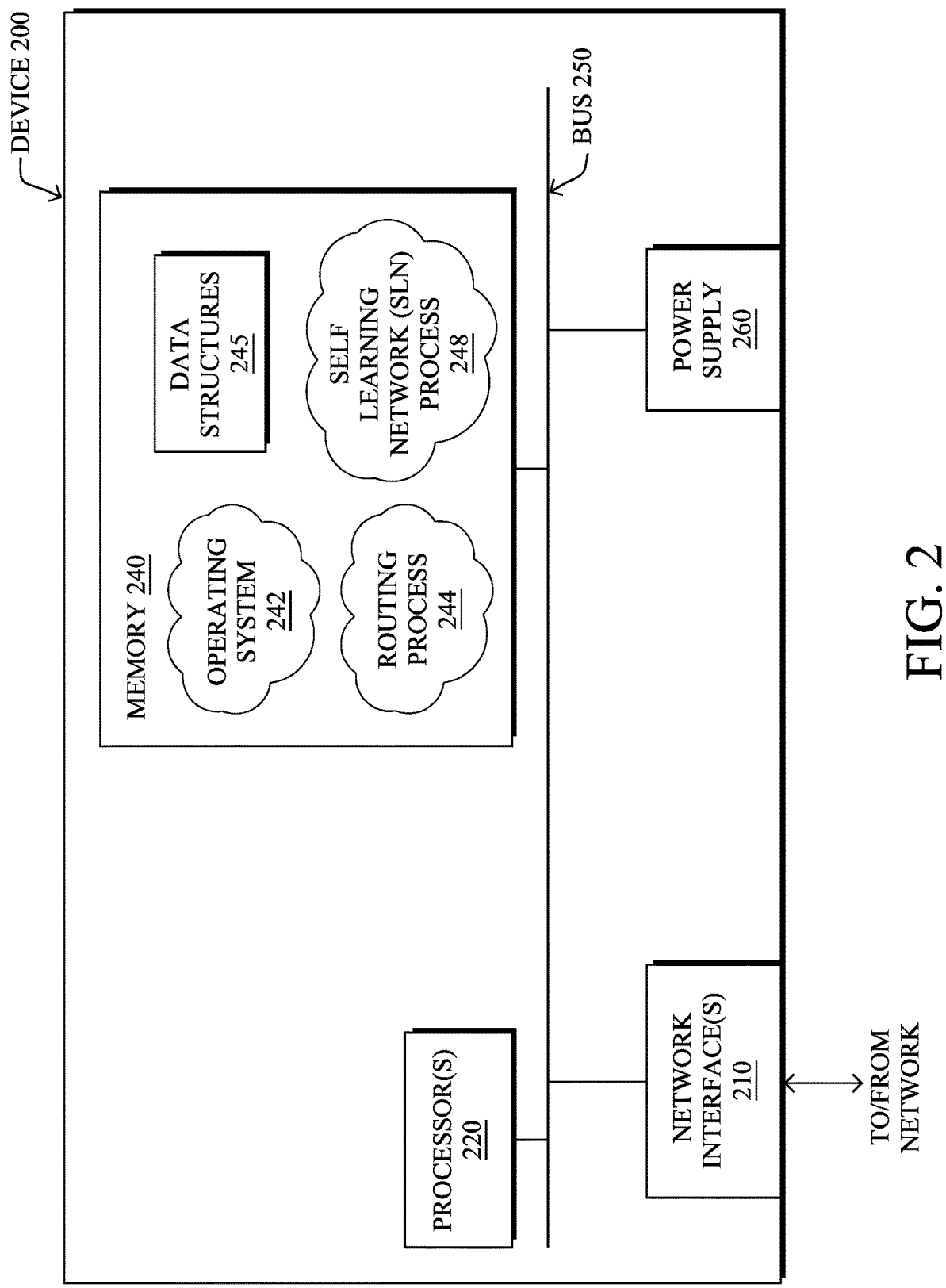
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-12vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc.

SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space.

Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
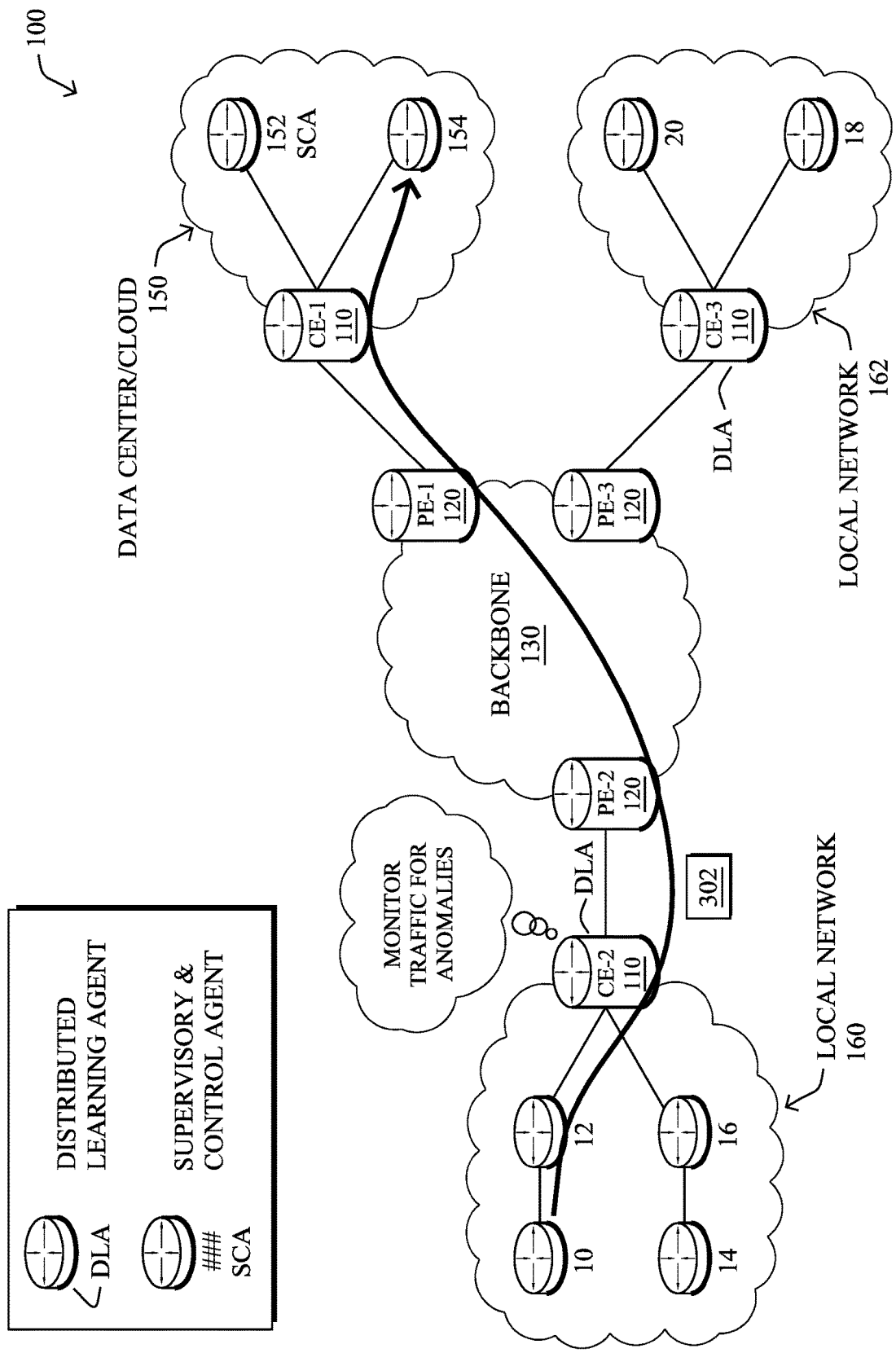
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
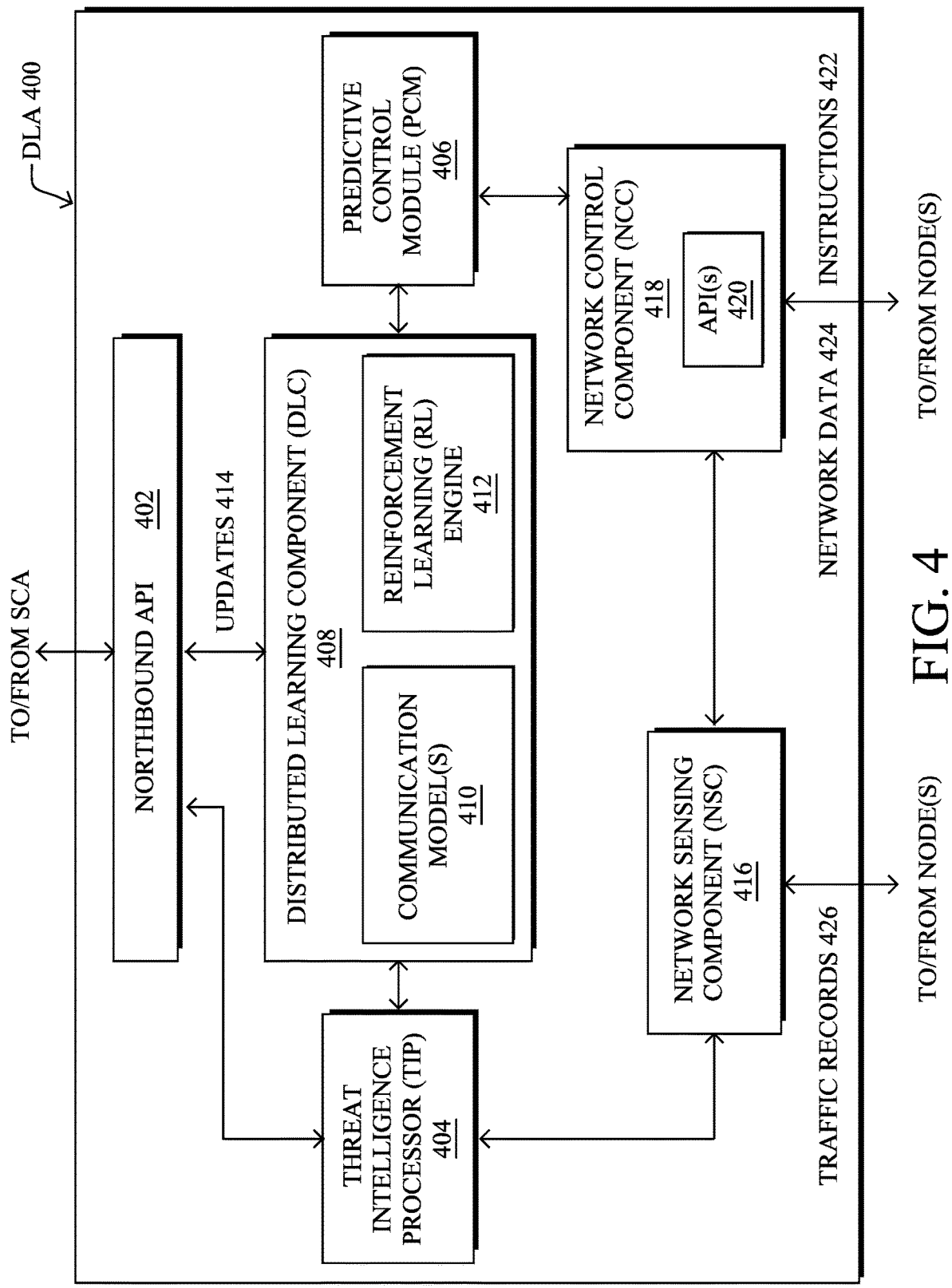
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, a distributed anomaly detection system may analyze different regions of a network. For example, a DLA may analyze traffic or other network characteristics associated with its local branch site/network. On many occasions, when several hosts in a large subnet are impacted by a common phenomenon, this can lead to the generation of several distinct anomalies, despite the underlying cause being the same. For example, situations like these can arise when a new application has been introduced with a very different signature across the network, when malware is propagated laterally in the network, when a systematic scan is performed either legitimately or maliciously, etc. In these situations, instead of continuing to raise anomalies distinctly as hosts are impacted, mechanisms are introduced herein that correlate and aggregate raised anomalies and provide more granularity into the underlying cause of the detected anomalies.

Increased Granularity and Anomaly Correlation Using Multi-Layered Distributed Analytics in the Network The techniques herein propose several mechanisms that correlate and aggregate raised anomalies based on the location of the involved hosts in the network. In addition to this, higher granularity is provided by running multiple DLAs in the network with varying or overlapping visibility of traffic.

Specifically, according to one or more embodiments of the disclosure as described in detail below, a primary networking device in a branch network receives a notification of an anomaly detected by a secondary networking device in the branch network. The primary networking device is located at an edge of the network. The primary networking device aggregates the anomaly detected by the secondary networking device and a second anomaly detected in the network into an aggregated anomaly. The primary networking device associates the aggregated anomaly with a location of the secondary networking device in the branch network. The primary networking device reports the aggregated anomaly and the associated location of the secondary networking device to a supervisory device.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Operationally, different approaches are introduced herein to provide anomaly aggregation and correlation at the network layer (e.g., at the network edge). An example of a network device performing aggregation among remote learning agents (RLAs) (e.g., DLAs) is illustrated in FIGS. 5A-5D. As shown, assume that a local network includes any number of host/client devices 502 (e.g., a first through n$^{th}$ host), any number of Layer-2 (L2) or other secondary networking devices 504 (e.g., a first through i$^{th}$ secondary networking device), and serviced by one or more primary networking devices 506, such as a router, gateway, etc. on the edge of the local/branch network. As would be appreciated, devices 504 may include switches or other specialized networking devices configured to enable L2 communications (e.g., via Ethernet, etc.) with host devices 502. In turn, L2 devices 504 may be communicatively coupled to L3 device(s) 506, which interface the local network with other networks via, e.g., WAN 130 (e.g., the Internet, an MPLS backbone network, cellular backup link, etc.).

In a first approach, in some embodiments, device 506 and selected other devices 504 in the network may execute analytics engines. In other words, both device 506, at the network edge, as well as the secondary networking devices 504, deployed in the local network closer to hosts 502, may be configured as a DLA to detect anomalous behavior. In other words, network elements at different locations in the network may analyze the traffic that is flowing through the network element. In a typical scenario, this would mean that analytics engines are running on L2 switches much deeper in the network (e.g., on devices 504) and closer to the end-point hosts 502. In addition to this, the network element managing the branch (e.g., device 506), such as the branch router, will also execute the analytics engine. This will ensure that there are at least two views into the network for any given traffic flow: one at the granularity of the L2 space and another that is branch wide.

Figure 5A:
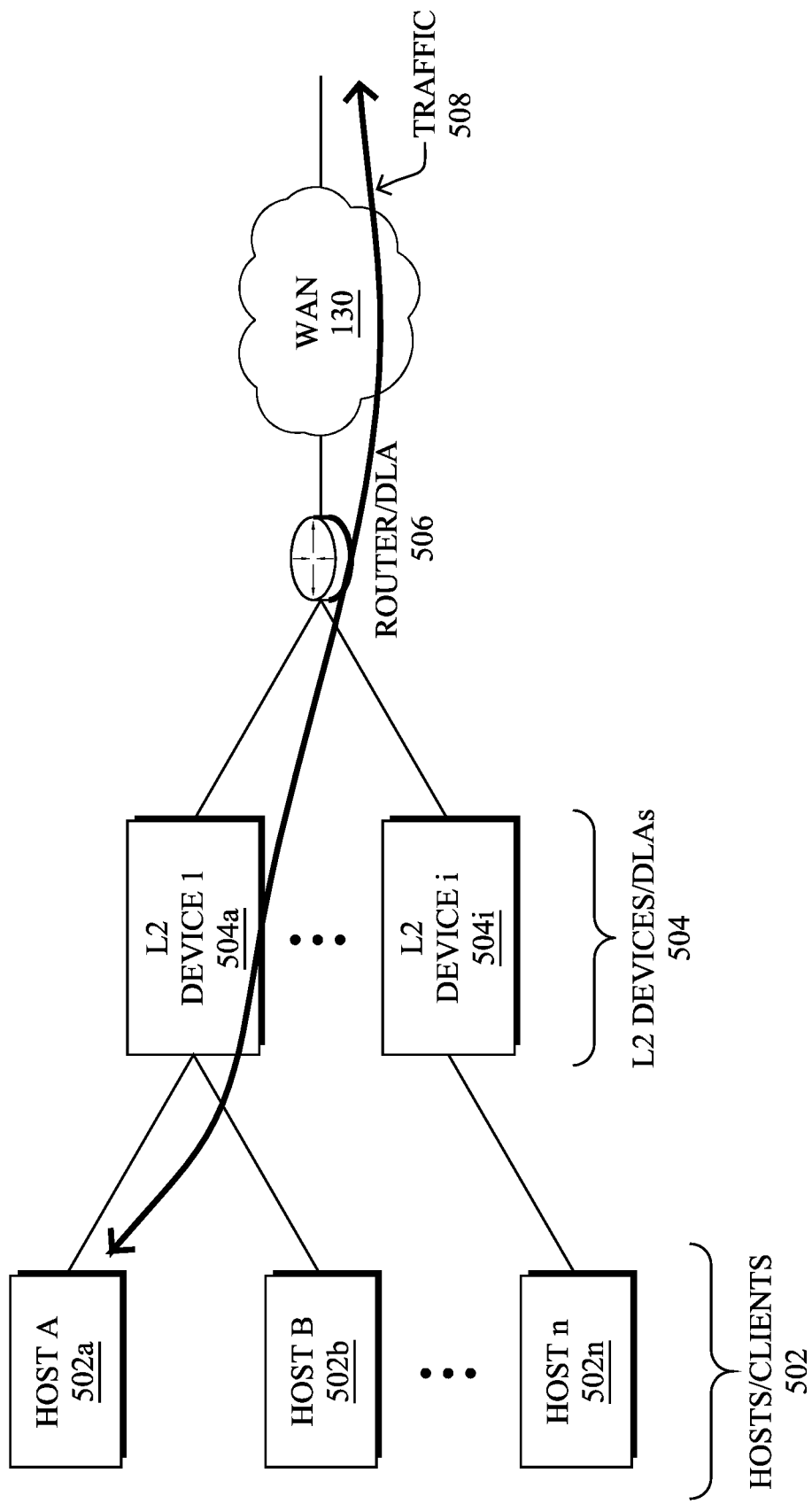
FIGS. 5A-5D illustrate an example of a device correlating detected anomalies.

As shown in FIG. 5A, consider the case in which host device 502a sends and/or receives traffic 508 to/from a remote device outside of the local network (e.g., via WAN 130). As traffic 508 traverses L2 device 504a, L2 device 504a may use its deployed analytics engine to analyze traffic 508. Similarly, as traffic 508 traverses device 506, it may independently analyze traffic 508 using its own anomaly detection mechanism.

Figure 5B:
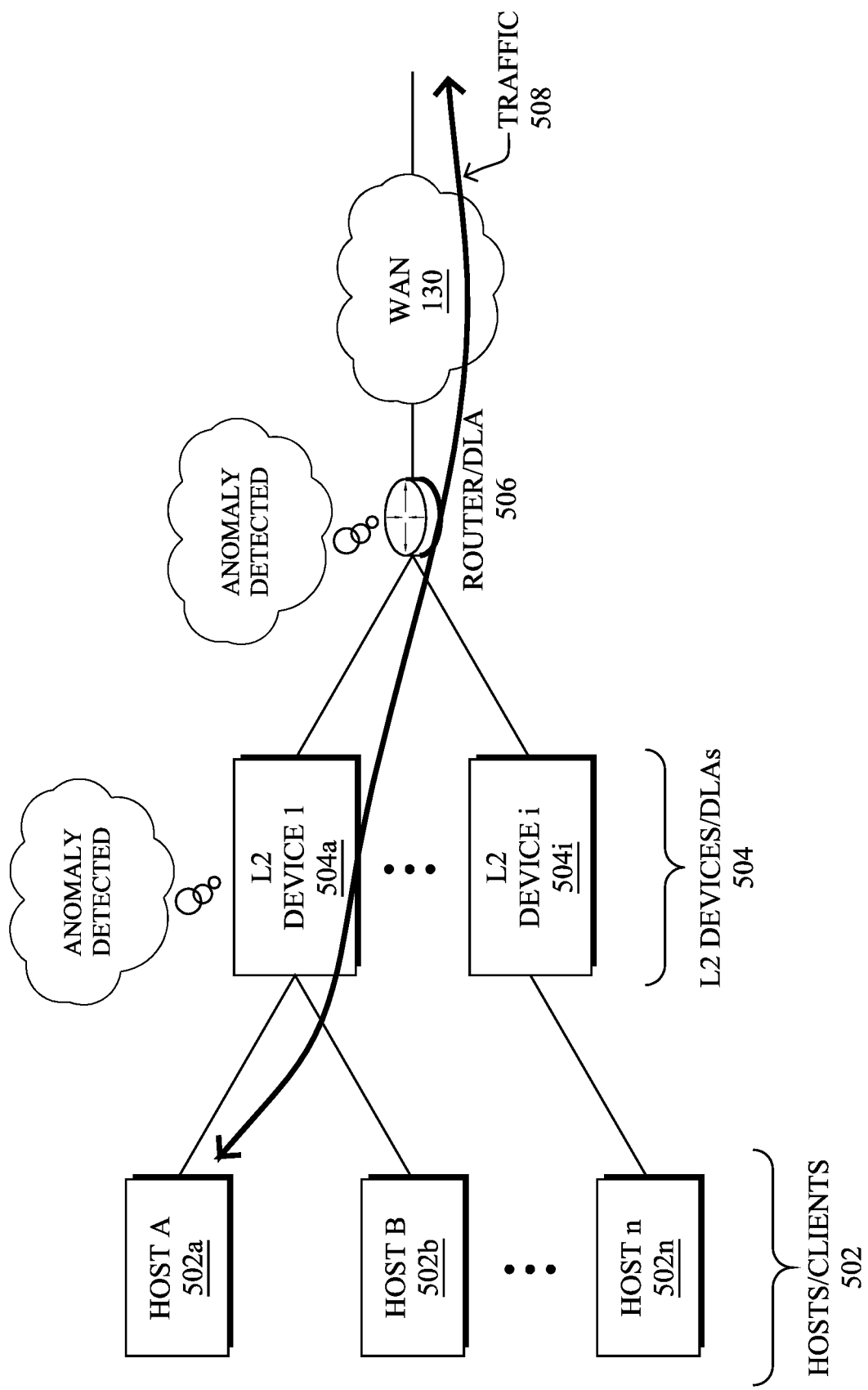

In the above scenario, if traffic 508 is anomalous, devices 504 and 506 may raise anomaly alerts at multiple points in the network based on the locations of the deployed analytics engine and the identity of the anomalous host (e.g., host device 502a). For example, as shown in FIG. 5B, both L2 device 504a and device 506 at the edge of the local network may determine that traffic 508 is anomalous.

Figure 5C:
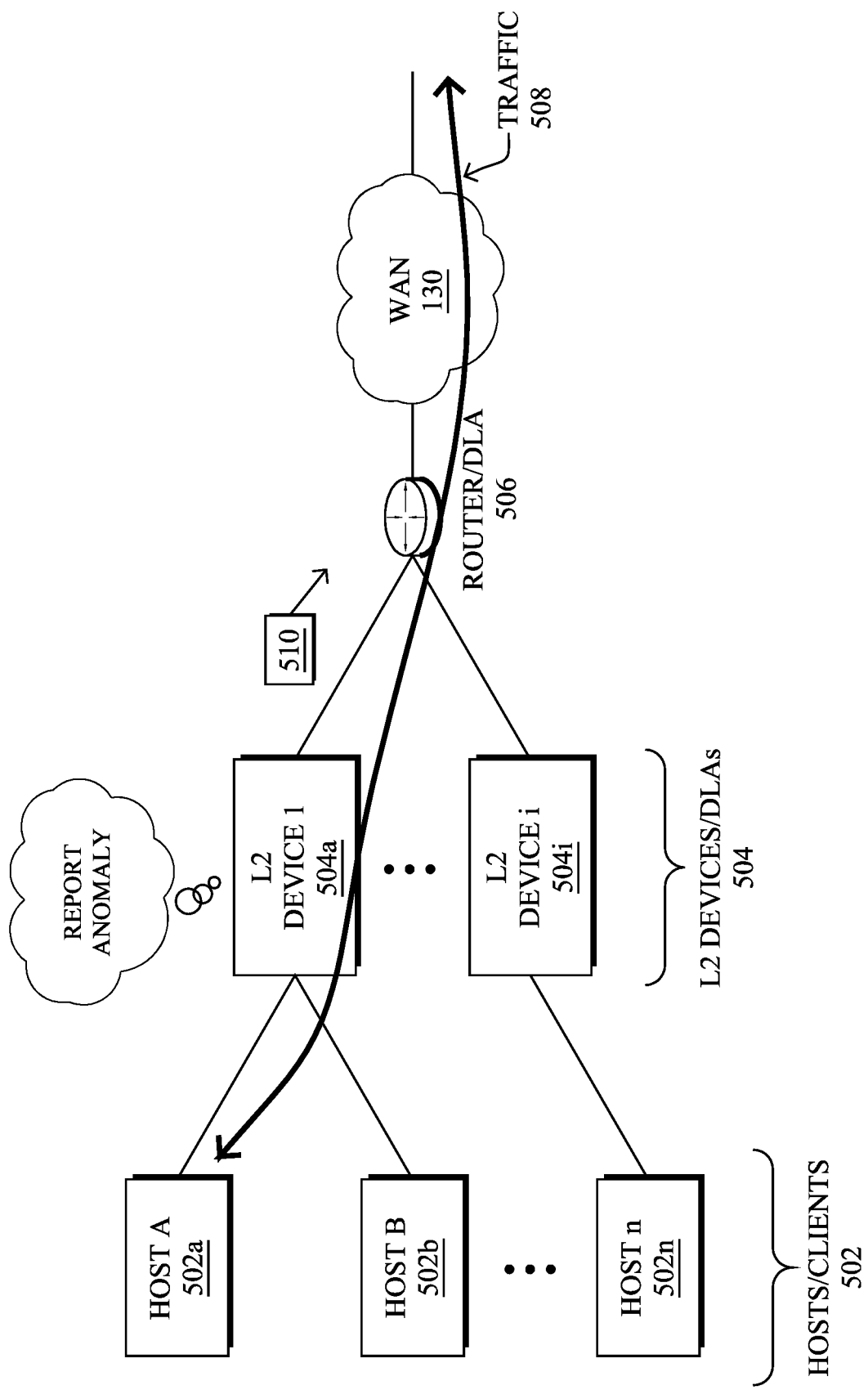

In some embodiments, an L2 device that detects an anomaly may send an indication of the detected anomaly to the corresponding device at the edge of the local network/branch. For example, as shown in FIG. 5C, L2 device 504a may send anomaly notification 510 to device 506, to notify device 506 that traffic 508 was deemed anomalous.

Figure 5D:
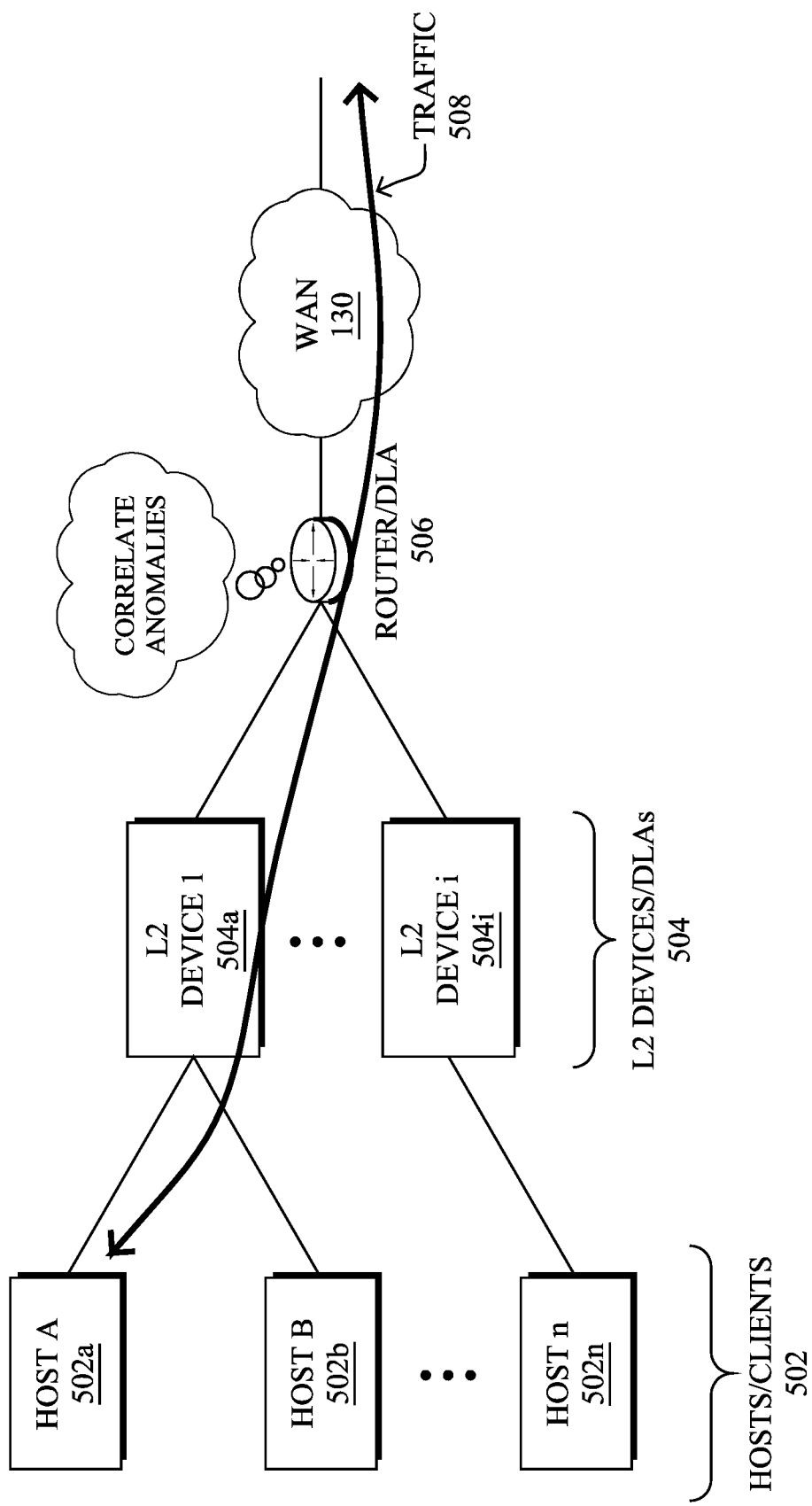

An edge/branch/etc. device that receives an anomaly notification from an L2 device may correlate/aggregate the received anomaly with an anomaly detected by its own anomaly detection mechanism. For example, as shown in FIG. 5D, device 506 may correlate its own assessment of traffic 508 with the anomaly indicated in anomaly notification 510. Generally, correlation may entail matching the characteristics of the two anomalies such as, e.g., an anomaly identifier, the addresses/ports of the anomalous traffic flow, an application associated with the traffic flow, the times of the traffic flows, etc. By correlating the anomaly detected by L2 device 504a with its own detected anomaly, device 506 is able to aggregate the anomalies and obtain greater granularity into the anomaly due to its location in the network. Particularly, device 506 can correlate the anomalies down to the same subnet by looking at the common L2 switch, L2 device 504a. In turn, device 506 may use this information to send an alert to the SCA (e.g., indicating the aggregated anomaly and the location of the switch), take anomaly mitigation measures, etc.

Figure 6A:
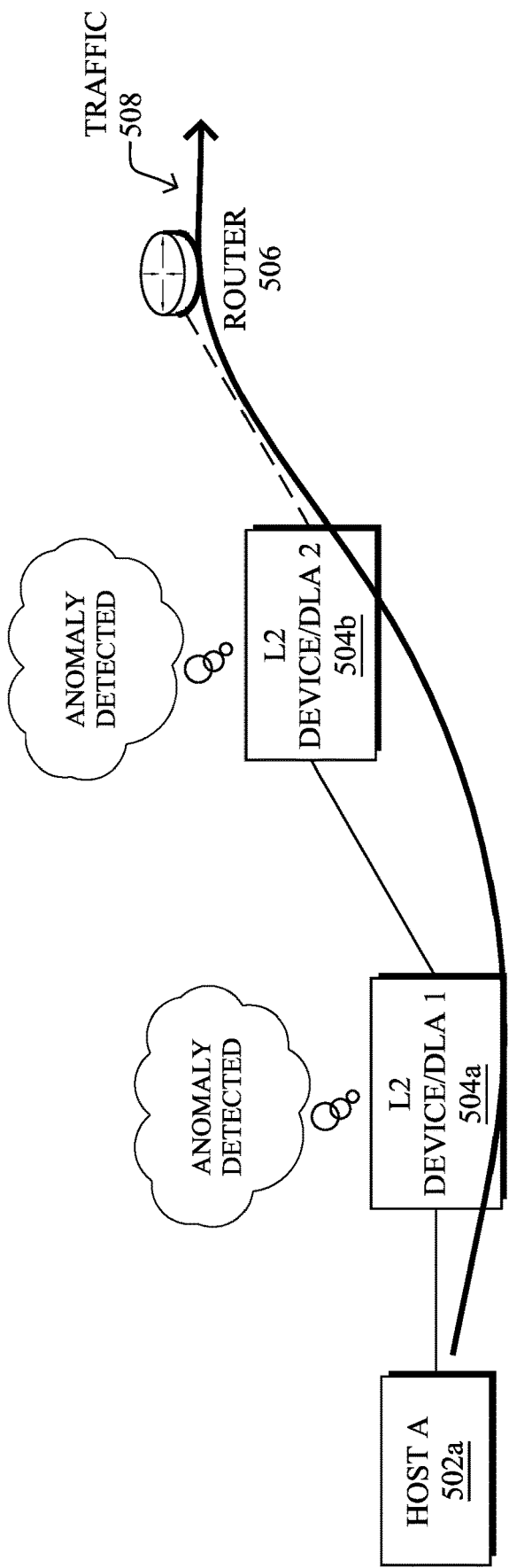
FIGS. 6A-6C illustrate an example of a device aggregating reported anomalies from secondary networking devices.
Figure 6B:
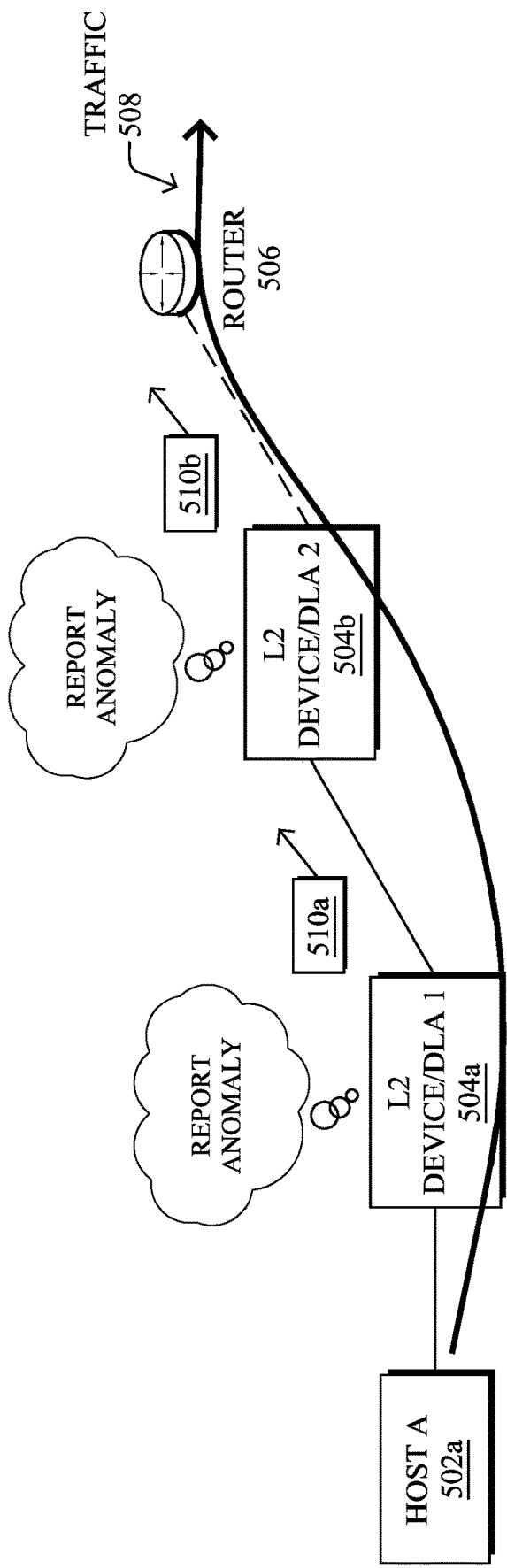
Figure 6C:
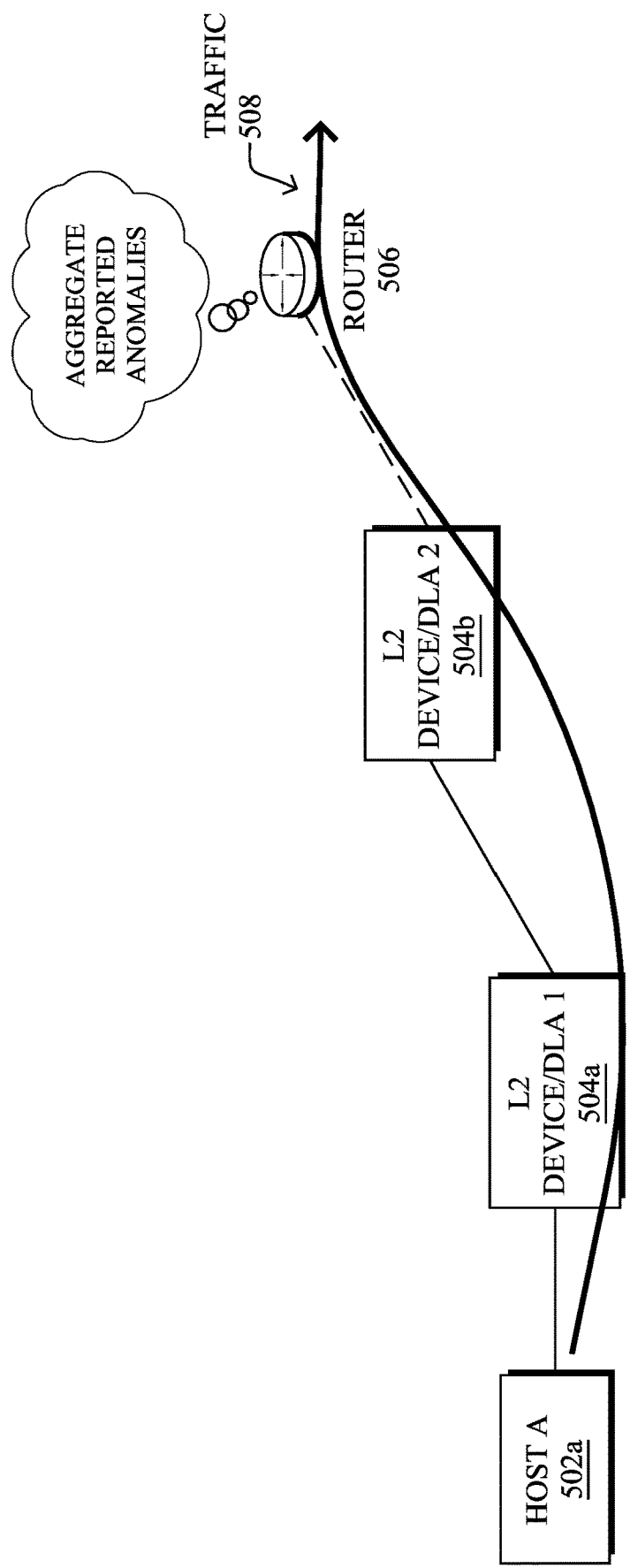

In a second approach, as illustrated in the example of FIGS. 6A-6C, the network element that has branch coverage (e.g., device 506 such as a branch router) may not execute its own analytics engine. In this embodiment, only the L2 devices or other secondary networking devices in the local network/branch execute the anomaly detection mechanism. For example, as shown in FIG. 6A, assume that L2 devices 502a and 502b are both configured with anomaly detection mechanisms, but that device 506 is not. In this scenario, the L2 network devices may detect and report anomalies to the branch/edge device (e.g., by sending an anomaly detection notification), as before, but are instead aggregated amongst themselves. For example, as shown in FIG. 6B, L2 device 504a may determine that traffic flow 508 is anomalous and send a first anomaly notification 510a to device 506. Similarly, L2 device 504*b* may also determine that traffic flow 508 is anomalous and send a second anomaly notification 510*b* to device 506. In turn, as shown in FIG. 6C, device 506 may aggregate anomaly notifications 510*a*-510*b*. In other words, if device 506 does not have its own anomaly detection mechanism, device 506 may still aggregate any reported anomalies in a similar manner based on the originating network element, to analyze the anomaly with further granularity.

In either case (e.g., whether anomaly alerts concerning the same event have been generated on different layers or by two or more peer devices), device 506 receiving the alert(s) may process the alert(s) as follows:

First, device 506 may determine whether the two (or more) alerts are representative of the same event. This can be done using different criteria including, but not limited to, any or all of the following:

The time frames of the two anomalies are compatible (e.g., their time periods overlap).

The traffic type associated with the two anomalies is overlapping (e.g., anomaly 1 reports HTTP and DNS traffic while anomaly 2 reports HTTP and FTP traffic). Note that in some cases, traffic types that do not match exactly this condition can still satisfy this condition if there is overlap, as the two anomalies may have been observed from different "angles" (e.g., two different switches have detected two intersecting streams of anomalous traffic).

The sets of addresses (e.g., IP addresses, etc.) involved in the two anomalies are overlapping. Note that strict IP matching is not required, in some cases, for the same reasons above with respect to traffic type.

If the first check indicates that the two or more alerts stem from the same phenomenon, then device 506 may perform a merging operation to extract the largest possible set of contextual data from the two information sources. In greater detail, if the anomaly reports contain traffic samples, device 506 may discard duplicates and create a unique set of representative samples. Optionally, if the resulting set of samples is too large, device 506 may adopt a more advanced technique to select a proper subset which will maximize the variety of the samples. If the anomaly reports (e.g., anomaly notifications 510) include cumulative statistics such as total bytes, packets, conversation counts, etc., the merging process may not be able to perform a correct merge. In such cases, the merging process may only compute an upper bound. The process may also perform a set-union operation with respect to the traffic types and IPs reported by the alerts.

In another embodiment, device 506 may employ a voting strategy to discard false positives. In particular, in response to receiving a first anomaly notification, device 506 may check the involved traffic streams against the Layer-2 branch topology. This will allow device 506 to determine which DLAs are on the path of the anomalous traffic. In turn, device 506 may adopt an n-out-of-m voting criterion in order to decide whether to merge the anomaly reports and propagate them to the controller/SCA or to classify the anomaly as a false positive and suppress the anomaly.

Note that device 506, the node in charge of merging anomalies (also referred to as the "aggregator"), may not see all anomalies since it may not be on the paths to the central controller (e.g., the SCA). In order to further optimize the system, the aggregator may send a custom request in response to detecting an anomaly, in order to detect if other network elements equipped with learning capabilities have detected the same anomaly. If the aggregator determines that other learning agent have detected the same anomaly but the aggregator has not seen these reported anomalies, it can then check whether it is because the aggregator is not on the path to the central controller. If so, it may then require the given anomaly profile to be redirected to the aggregator in the future in order to perform a model aggregation.

In high throughput environments, running analytics engines continuously on traffic in real-time is a challenge. Generating flow data such as those from Netflow could become very resource intensive, both from a computation/memory point of view, as well as from a link capacity point of view. In this situation, unless there is a dedicated analytics engine node co-located (but not on-box) with the primary network element (such as a campus gateway or branch router), it may be challenging to keep running analytics in a continuous real-time mode of operation. One option entails using sampled Netflow or other traffic records, but this but that has the drawback of losing granularity/visibility. In addition to this, using any sort of DPI to supplement anomaly detection is also very difficult to implement. Further, application recognition technologies, which could be resource intensive, also need access to the complete traffic for any kind of classification.

Further aspects of the techniques herein introduce a mechanism whereby, in response to detecting an unfavorable resource usage conditions due to high throughput, analytics engines will be directly spun up on supporting network elements deep within the network (e.g., on L2 switches, etc.). Correspondingly, a gateway or other primary networking element (e.g., a branch router, etc.), may execute a correlation/aggregation engine to coordinate and aggregate the anomalies being generated, as described previously. Generally, the primary network element will be responsible for deciding when to spin up new instances and offload the responsibility, whereas the secondary network elements will be the ones spinning up new analytics instances. In a typical network setup the primary network element will be a branch router or a campus gateway router, whereas the secondary elements will be either L2 switches or lesser powered routers managing small subnets.

More specifically, techniques are introduced that allow DLAs to be started downstream in a network by a primary learning agent, to reduce the amount of flows that need to be tracked. This allows dynamic redistribution of learning functionality in the network in a planned fashion for very high uplink speed networks, such as campus scenarios, such that no one network element has to handle all the flows in the network for learning purposes.

Figure 7A:
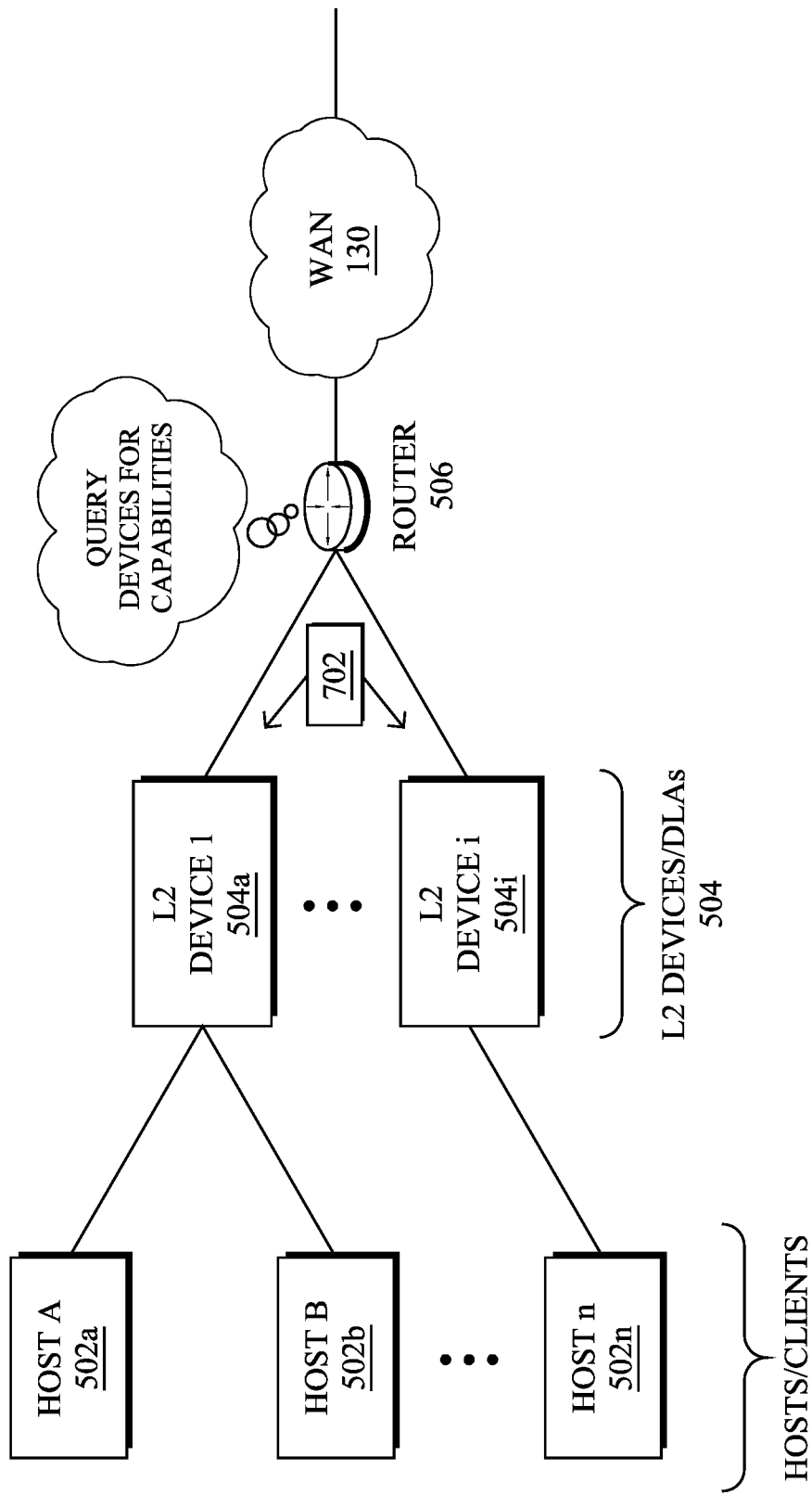
FIGS. 7A-7D illustrate an example of a device deploying anomaly detection mechanisms to secondary networking devices.

Referring now to FIGS. 7A-7D, a first component is introduced herein that handles messaging and selection between the various network elements, to determine which ones are capable and willing to host a new instance of analytics. As shown in FIG. 7A, the primary network element, device 506, may send out one or more query message(s) 702 into the network to discern the capabilities of the secondary networking devices 504. For example, query message(s) 702 may query devices 504 for their abilities to start anomaly detection (AD) analytic engines, details regarding their visibility levels in terms of network traffic, or any other information that device 506 may use to select which of devices 504 are to perform anomaly detection.

Figure 7B:
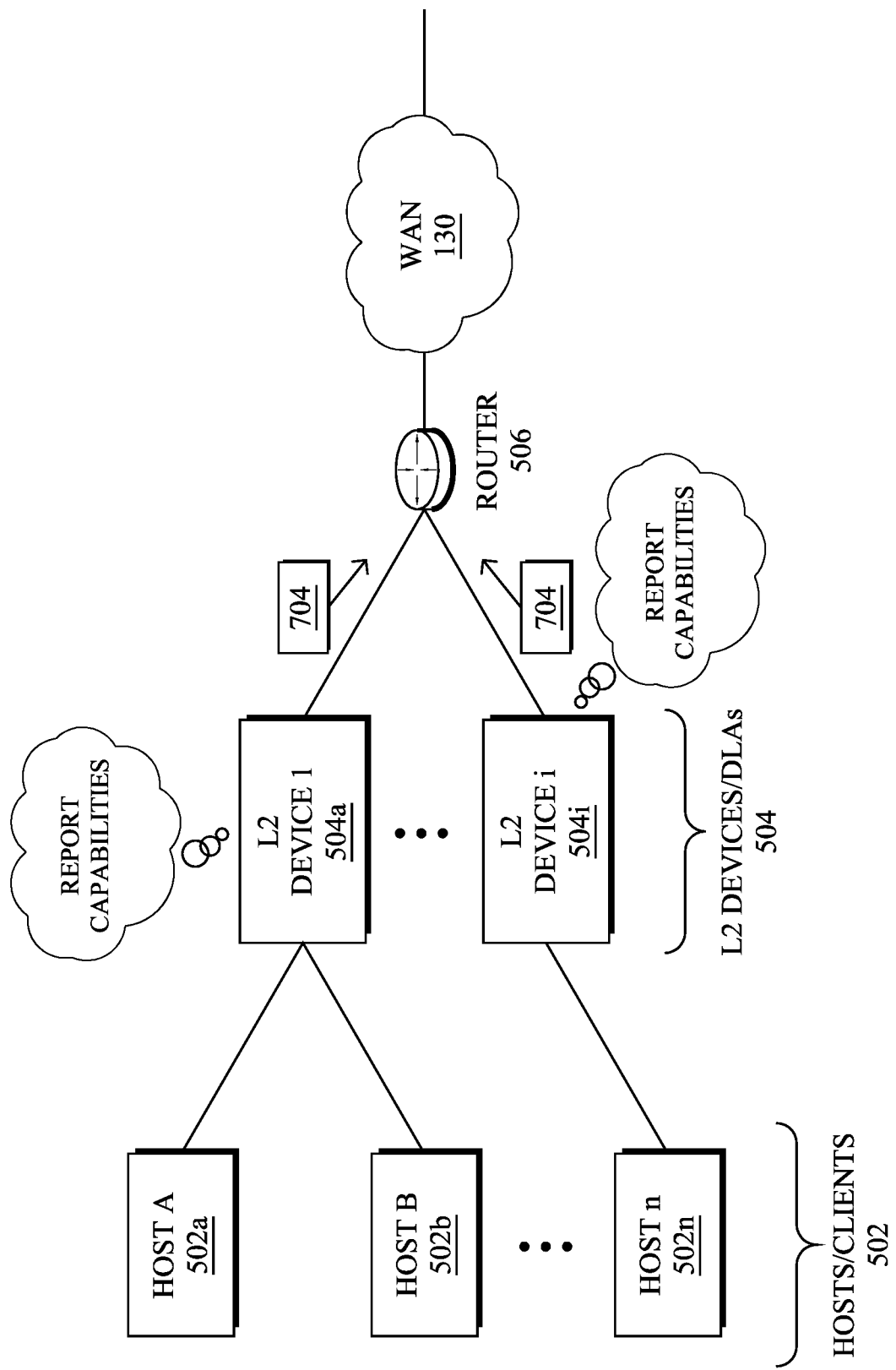
Figure 7C:
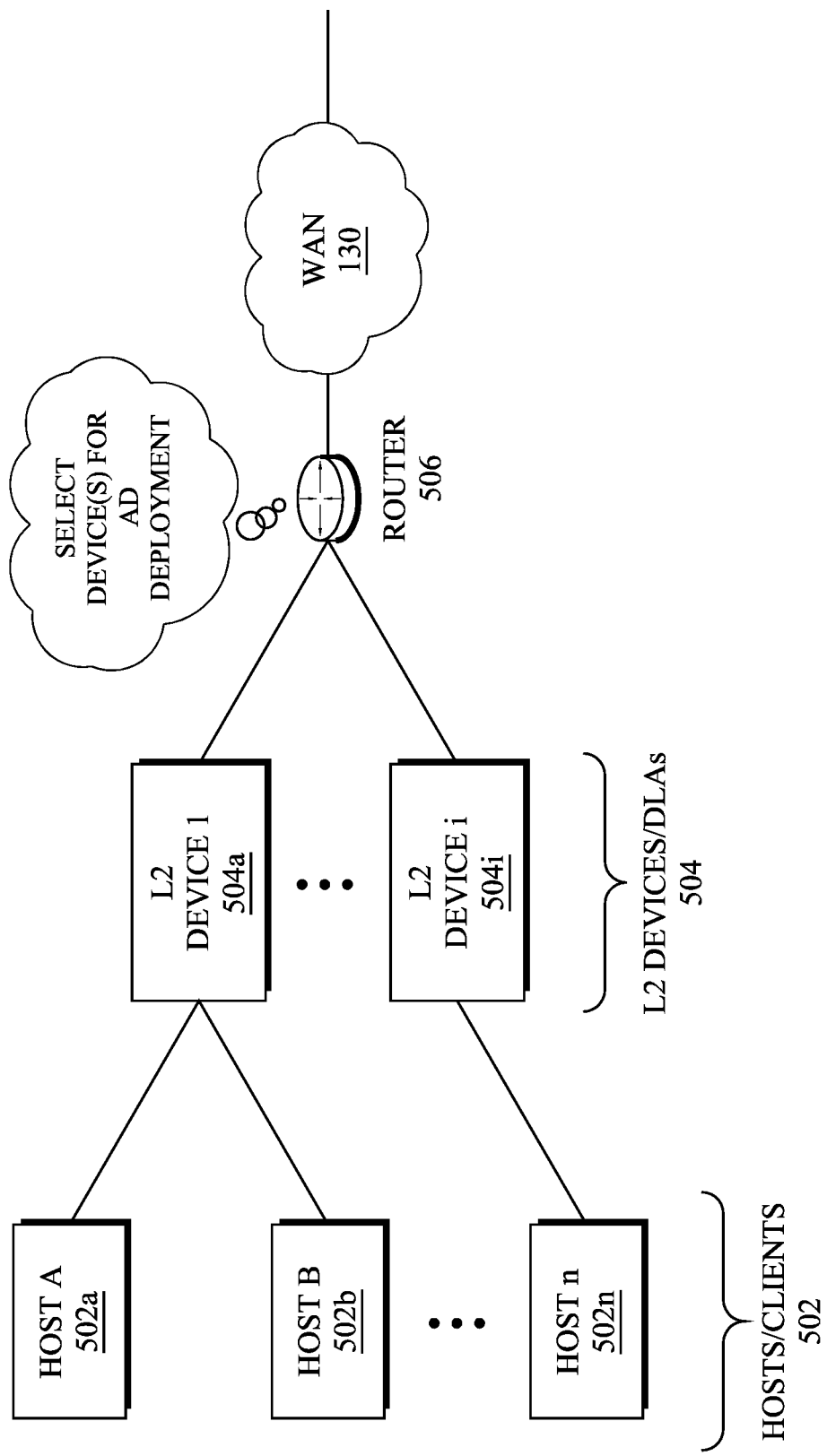
Figure 7D:
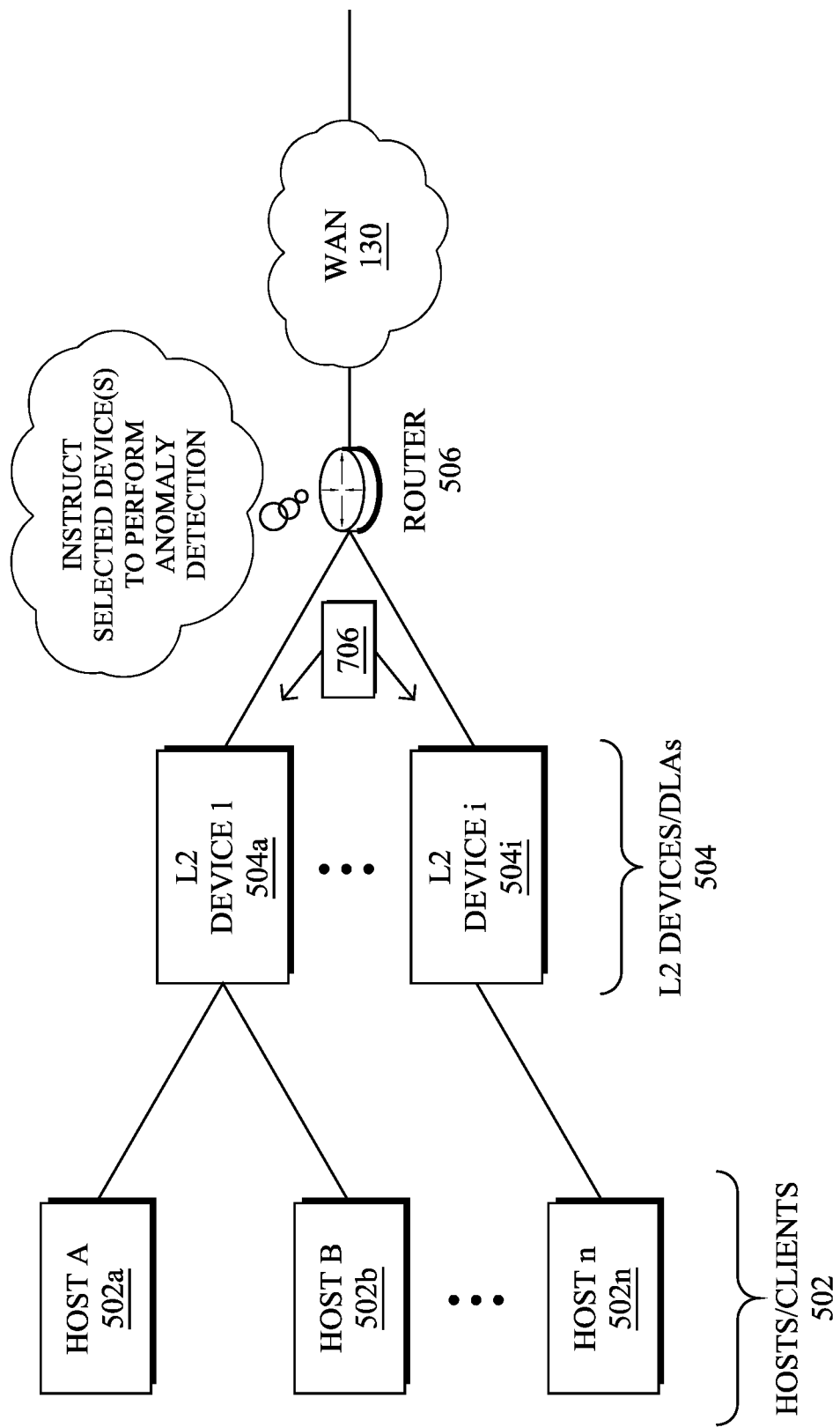

As shown in FIG. 7B, devices 504 may send response(s) 704 back to device 506 that include the information requested by query message(s) 702. In turn, as shown in FIG. 7C, the primary network element (e.g., device 506) may select from among the secondary network elements (e.g., devices 504) based on any number of different factors. Such factors may include, but are not limited to, the size of the subnets and hence the degree of visibility of the reporting device 504, the northbound throughput of the reporting device 504, the criticality of the traffic flowing through the device 504, etc. Once this selection has been made by the primary network element, device 506 may send a custom instruction message 706 to the selected secondary network devices 504, as shown in FIG. 7D. Generally, instruction messages 706 cause the receiving device(s) 504 to spin up anomaly detection/analysis instances and may include specific parameters and/or programs in support thereof.

In another embodiment, the locations of the devices that will perform the analytics may be completely decoupled from the locations of the devices that will capture the input network data. In particular, the primary network element may perform an optimization whose output are of three types:
- A set of data sources nodes in devices 504 each of them monitoring a portion of the traffic described by an ACL $L_1,L_2$ and sending the data matching $L_1,L_2$ to the analytics engines $A_1,A_2$ hosted by other nodes in devices 504.
- A set of data analysis nodes 504 which will host the analytics engines $A_1$, $A_2$ (e.g., are to act as DLAs).
- A mapping between the traffic captured by nodes in devices 504 and the analytics engines $A_1,A_2$.

Figure 8:
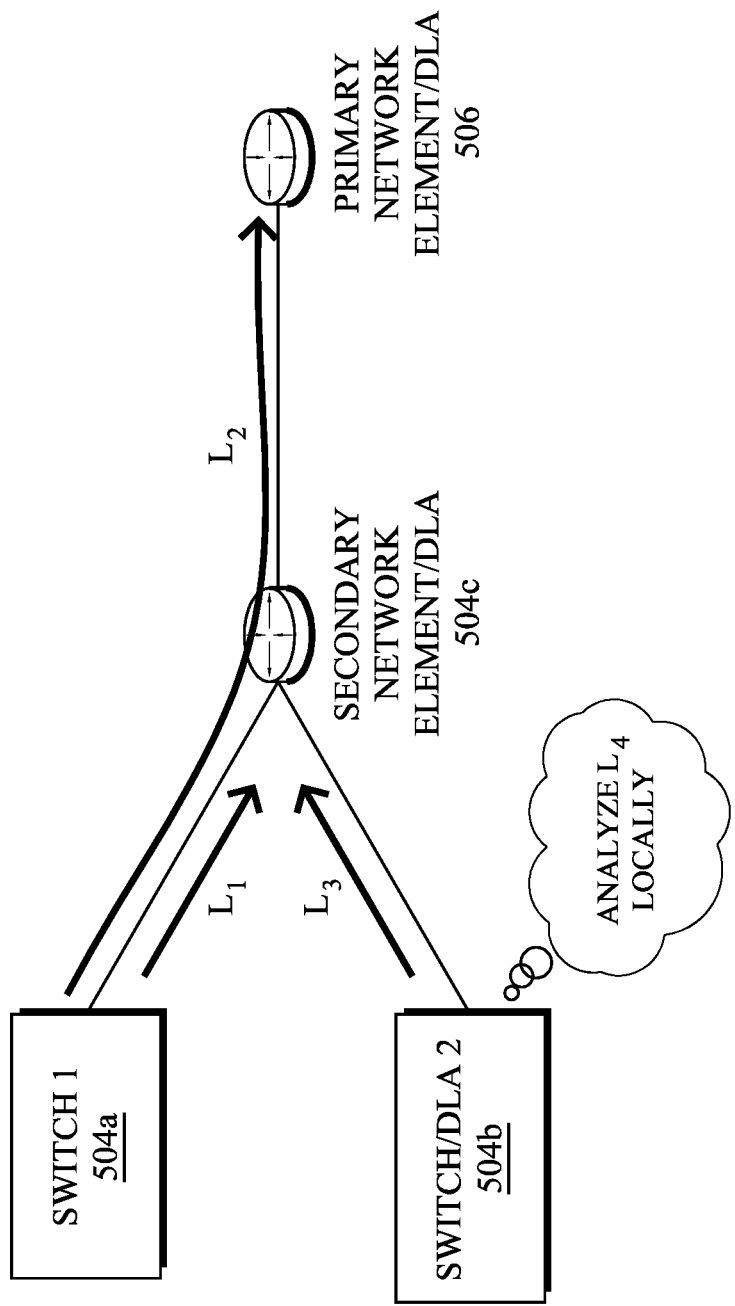
FIG. 8 illustrates an example of the selective deployment and application of anomaly detectors.

An example of a possible implementation is shown in FIG. 8. Consider the case in which two analytics engines are spun up with one on a secondary network element 504c and one on a switch 504b. The two switches 504a-504b shown may be configured as data sources and, on each of them, two ACLs are installed. On the first switch, device 504a, information about traffic matching ACL $L_1$ may be redirected to the primary network element, device 506, while information about traffic matching ACL $L_2$ may be redirected to the dynamically spun up engine on the secondary network element, device 504c. Similarly, the other switch, device 504b, may send statistics about traffic matching $L_3$ to the secondary network element, device 504c, while consuming traffic matching $L_4$ locally using its dynamically spun up anomaly analytics engine.

In some embodiments, the above optimization may be subject to a number of constraints. First of all, the type of analytics involved may impose the constraint that two different subsets of the traffic cannot be processed by two independent engines. For example, assume that a particular analytics engine is modelling the interactions of different group of hosts with respect to a particular application. In this case, all of the observed traffic belonging to that application will have to be analyzed by the same engine. However, the analytics work can easily be split among different engines by giving each of them the responsibility of modelling a particular application.

Other constraints may include the maximum amount of traffic that each of the spun up analytics engines can process, as well as the maximum amount of bandwidth that the reported statistics can consume in the network. Notably, the dynamic spin up approach herein forces some information to be sent over the local network instead of being consumed locally by a device.

Another aspect of the techniques herein involves the dynamic spin up of the analytics instances by the secondary network elements once they receive the message from the primary network element to do so. This involves dynamic configuration of all the parameters, some of which are provided by the primary element, and others which are determined on the fly based on the location, traffic profile, capabilities of the network element etc. Once configuration completes, the analytics engine is brought online and starts the learning and detection process, just like an autonomous analytics engine would. The secondary element then sends a message to the primary element to update the current state.

A further aspect of the techniques herein involves the aggregation and coordination of the anomalies generated by the secondary network elements at the primary network element. The role of the primary network element at this point is to determine the most critical anomalies, their relevance, correlation to the other anomalies etc. It then sends the relevant ones to the central agent (e.g., the SCA) that is responsible for presenting them to the investigators. Note that the aggregation and correlation mechanisms described above may be used to process the alerts generated by different analytics instances on the secondary networking devices.

Figure 9A:
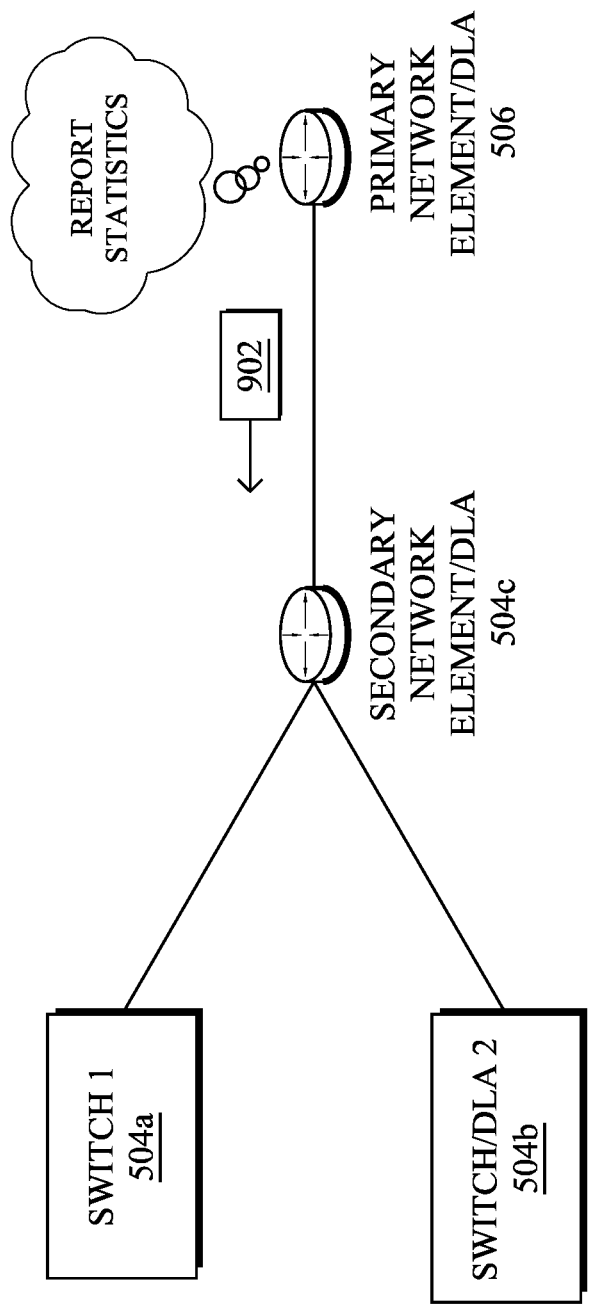
FIGS. 9A-9B illustrates an example of a device adjusting the anomaly detection mechanism of secondary devices.
Figure 9B:
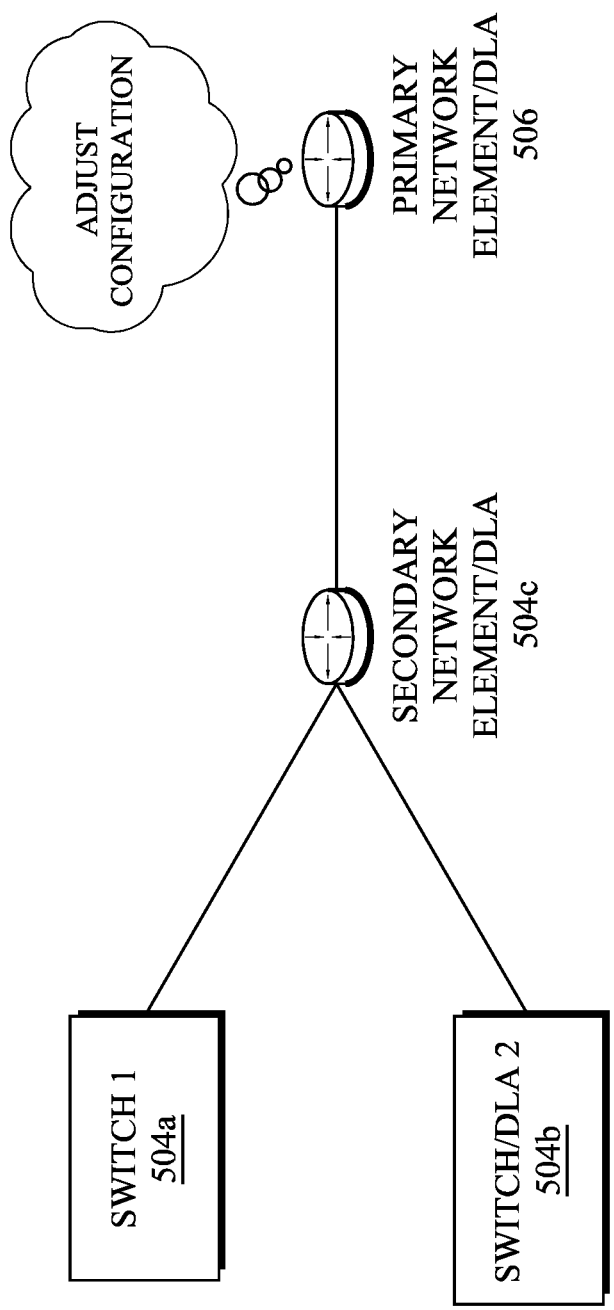

Referring now to FIGS. 9A-9B, examples are illustrated of the primary network element adjusting the configuration of the secondary elements. In some embodiments, primary networking device 506 may monitor the status of the analytics engines/DLAs deployed among the secondary networking devices 504. For example, device 506 may send a statistics_request( ) message 902 to the devices 504 running the analytics engines, to retrieve health statistics. These statistics may include, but are not limited to, any or all of the following:
- The number of dropped messages
- Internal state of the queues
- CPU and memory utilization As shown in FIG. 9B, the primary networking device 506 may adjust the configuration of the secondary networking devices 504 in any number of ways. In some embodiments, device 506 may spin down one or more of the distributed analytics engines. For example, device 506 may use the returned health information to determine that a particular analytics engine is under-loaded and, in turn, instruct the secondary network device 504 to spin down its engine. In another example, device 506 may determine that it has received sufficient anomaly information from the secondary elements 504 and, in turn, instruct one or more of the devices 504 to spin down its analytics engine. Such a decision may be based on, e.g., the traffic flowing through the secondary device is not critical or has a characteristic that is not of interest. In further embodiments, device 506 may adjust the configuration of secondary devices 504 by adding analytics engines to the devices or adjusting the assignment of traffic to the engines for analysis.

Figure 10:
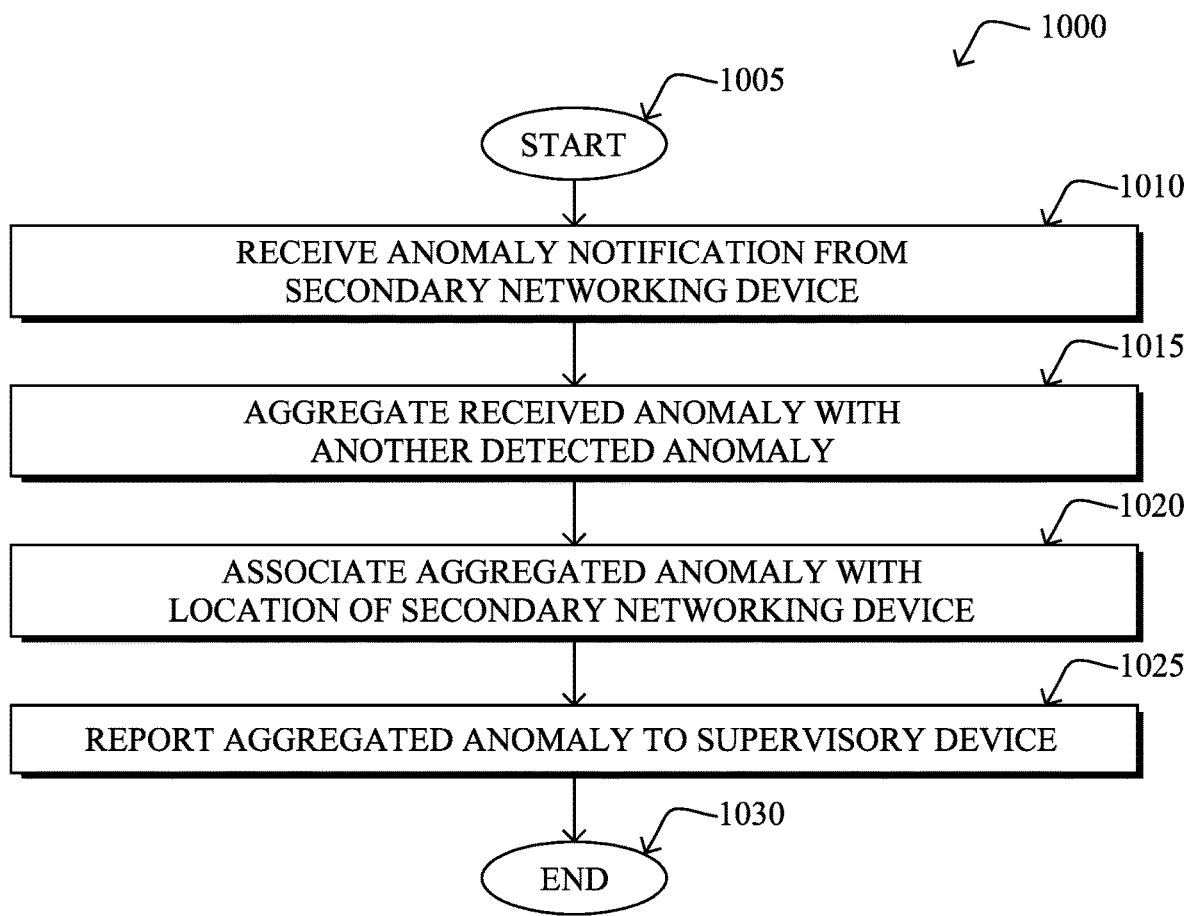
FIG. 10 illustrates an example simplified procedure for using multi-layered analytics in a network.

FIG. 10 illustrates an example simplified procedure for using multi-layered analytics in a network, in accordance with various embodiments herein. In various embodiments, procedure 1000 may be performed by a specialized networking device (e.g., device 200) when executing stored machine instructions or, alternatively, processing routines implemented as hardware. For example, a router, gateway, or other primary networking device located at the edge of a branch networking may perform procedure 1000. Procedure 1000 may start at step 1005 and continues on to step 1010 where, as described in greater detail above, the primary networking device receives a notification of an anomaly detected by a secondary networking device in the network. In some embodiments, the secondary networking device may be a Layer-2 device, such as a switch, or may be a lesser powered router located deeper in the network than the primary networking device.

At step 1015, as detailed above, the primary networking device may aggregate the received anomaly with a second anomaly detected in the network. In some embodiments, the primary networking device may detect the second anomaly itself. For example, if a traffic flow traverses both the primary and secondary networking devices, both devices may independently determine that the traffic flow is anomalous (e.g., on both Layer-2 and Layer-3 devices). In other embodiments, the primary networking device may receive a second anomaly notification from a peer of the secondary networking device in the network (e.g., another switch, etc.). The primary device may aggregate the anomalies by determining an overlap between the anomalies based on a partial or full overlap of any or all of the following: the addresses and/or ports associated with the anomaly, the traffic type(s) associated with the anomaly, or a timeframe associated with the anomalies.

At step 1020, the primary networking device may associate the aggregated anomaly with the location of the secondary networking device in the network, as described in greater detail above. In particular, since the secondary networking device is deployed further into the network and closer to the corresponding host(s)/client(s), the location of the secondary networking device may add further granularity to the information about the aggregated anomaly. This information may allow a network administrator to further pinpoint which portions of the network are affected by the anomaly.

At step 1025, as detailed above, the primary networking device may notify a supervisory device as to the aggregated anomaly. For example, as detailed above, the primary networking device may send the aggregated anomaly and the location of the secondary networking device to an SCA or other supervisory device that oversees anomaly detection in the network. In turn, the supervisory device may issue instructions to the primary and/or secondary networking devices (e.g., to block certain traffic, to blacklist a certain server, etc.), present information regarding the aggregated anomaly to a user interface, or perform other functions with the information. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the correlation of anomalies generated by hosts that lie in the same logical address space in the network, either managed by the same L2 switch or an L3 router. The techniques also allow for the aggregation of anomalies across these hosts to reduce the anomalies needed to be investigated. Further, the correlation and aggregation allows they system to identify common underlying issues that are resulting in raised anomalies across multiple hosts (e.g., they all lie in the same L2 space, so it could be a new application rollout or a lateral movement). The techniques further allow for assessment of the anomalies with a higher granularity, as multiple DLAs with differing traffic visibility (inter-switch, intra-branch etc.) may report different anomalies, providing a new insight.

Further aspects of the techniques herein allow for the dynamic distribution of learning responsibilities, such as in high volume/uplink speed environments where there are typically many flows to be analyzed. When there are changes of network such that there are either more or less flows, learning functionality can be dynamically spun up or spun down on downstream network elements as required. Further, these techniques allow the learning process to continue in the network, irrespective of the amount of traffic being generated in the network and without any pre-configured mechanism.

While there have been shown and described illustrative embodiments that provide for using multi-layer, distributed analytics in a network, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a primary networking device in a branch network, a notification of an anomaly detected by a secondary networking device in the branch network, wherein the primary networking device is located at an edge of the branch network;
identifying, by the primary networking device, an overlap between the anomaly detected by the secondary networking device and a second anomaly detected in the branch network;
aggregating, by the primary networking device and in response to identifying the overlap, the anomaly detected by the secondary networking device and the second anomaly detected in the branch network into an aggregated anomaly;
associating, by the primary networking device, the aggregated anomaly with a location of the secondary networking device in the branch network; and
reporting, by the primary networking device, the aggregated anomaly and the associated location of the secondary networking device to a supervisory device, wherein the supervisory device performs a mitigation measure based on the aggregated anomaly and the associated location.

2. The method as in claim 1, further comprising:
detecting, by the primary networking device, the second anomaly using a local anomaly detector.

3. The method as in claim 1, further comprising:
receiving, at the primary networking device, a notification of the second anomaly from another secondary networking device in the branch network that differs from the secondary networking device.

4. The method as in claim 1, wherein the overlap between the anomaly and the second anomaly is in terms of one or more of: network addresses associated with the anomalies, network ports associated with the anomalies, traffic types associated with the anomalies, or time frames associated with the anomalies.

5. The method as in claim 1, wherein the primary networking device comprises a router or gateway.

6. The method as in claim 1, wherein the secondary networking device comprises a Layer-2 switch.

7. The method as in claim 1, further comprising:
identifying, by the primary networking device, one or more anomaly detectors along a traffic path associated with the anomaly detected by the secondary networking device, based on a Layer-2 topology of the branch network; and
determining, by the primary networking device, whether the anomaly detected by the secondary networking device is a false positive based on whether the identified one or more anomaly detectors also detected an anomaly.

8. The method as in claim 1, further comprising:
instructing, by the primary networking device, the secondary networking device to perform anomaly detection on a first subset of traffic traversing the secondary networking device, based on the location of the secondary networking device in the network.

9. The method as in claim 8, further comprising:
instructing, by the primary networking device, the secondary networking device to forward information regarding a second subset of the traffic traversing the secondary networking device to another device in the network for anomaly detection.

10. The method as in claim 8, further comprising:
querying a status of the secondary networking device; and
instructing the secondary networking device to spin down performance of anomaly detection on the first subset of the traffic traversing the secondary networking device.

11. An apparatus, comprising:
one or more network interfaces to communicate with a network;
a processor coupled to the network interfaces and configured to execute one or more processes; and
a memory configured to store a process executable by the processor, the process when executed configured to:
receive a notification of an anomaly detected by a secondary networking device in the branch network, wherein the primary networking device is located at an edge of the network;
identify an overlap between the anomaly detected by the secondary networking device and a second anomaly detected in the branch network;
aggregate, in response to identification of the overlap, the anomaly detected by the secondary networking device and the second anomaly detected in the network into an aggregated anomaly;
associate the aggregated anomaly with a location of the secondary networking device in the branch network; and
report the aggregated anomaly and the associated location of the secondary networking device to a supervisory device, wherein the supervisory device performs a mitigation measure based on the aggregated anomaly and the associated location.

12. The apparatus as in claim 11, wherein the process when executed is further configured to:
detect the second anomaly using a local anomaly detector.

13. The apparatus as in claim 11, wherein the process when executed is further configured to:
receive a notification of the second anomaly from another secondary networking device in the branch network that differs from the secondary networking device.

14. The apparatus as in claim 11, wherein the overlap between the anomaly and the second anomaly is in terms of one or more of: network addresses associated with the anomalies, network ports associated with the anomalies, traffic types associated with the anomalies, or time frames associated with the anomalies.

15. The apparatus as in claim 11, wherein the process when executed is further configured to:
send an instruction to the secondary networking device to dynamically adjust which traffic types for which the secondary networking device performs anomaly detection and which traffic types the secondary networking device forwards to another device for anomaly detection.

16. The apparatus as in claim 15, wherein the secondary networking device comprises a Layer-2 switch.

17. The apparatus as in claim 11, wherein the process when executed is further configured to:
identify one or more anomaly detectors along a traffic path associated with the anomaly detected by the secondary networking device, based on a Layer-2 topology of the branch network; and
determine whether the anomaly detected by the secondary networking device is a false positive based on whether the identified one or more anomaly detectors also detected an anomaly.

18. The apparatus as in claim 11, wherein the process when executed is further configured to:
instruct the secondary networking device to perform anomaly detection on a first subset of traffic traversing the secondary networking device, based on the location of the secondary networking device in the network.

19. The apparatus as in claim 18, wherein the process when executed is further configured to:
instruct the secondary networking device to forward information regarding a second subset of the traffic traversing the secondary networking device to another device in the network for anomaly detection.

20. A tangible, non-transitory, computer-readable media having software encoded thereon, the software when executed by a processor of a primary networking device in a network configured to:
receive a notification of an anomaly detected by a secondary networking device in the network, wherein the primary networking device is located at an edge of the network;
identify an overlap between the anomaly detected by the secondary networking device and a second anomaly detected in the branch network;
aggregate, in response to identification of the overlap, the anomaly detected by the secondary networking device and the second anomaly detected in the network into an aggregated anomaly;
associate the aggregated anomaly with a location of the secondary networking device in the branch network; and
report the aggregated anomaly and the associated location of the secondary networking device to a supervisory device, wherein the supervisory device performs a mitigation measure based on the aggregated anomaly and the associated location.

* * * * *

UNITED STATES PATENT AND TRADEMARK OFFICE
CERTIFICATE OF CORRECTION

| | | |
|---|---|---|
| PATENT NO. | : 10,581,901 B2 | Page 1 of 1 |
| APPLICATION NO. | : 15/154349 | |
| DATED | : March 3, 2020 | |
| INVENTOR(S) | : Sukrit Dasgupta et al. | |

It is certified that error appears in the above-identified patent and that said Letters Patent is hereby corrected as shown below:

In the Specification

Column 6, Line 48, should read:
VPN"<draft-ietf-l2vpn-evpn>, introduce a solution for mul- Signed and Sealed this
Thirtieth Day of June, 2020

Andrei Iancu
*Director of the United States Patent and Trademark Office*